June 30, 1964   W. T. MAYS ETAL   3,138,912
HARVESTING APPARATUS
Filed Aug. 22, 1962   2 Sheets-Sheet 2
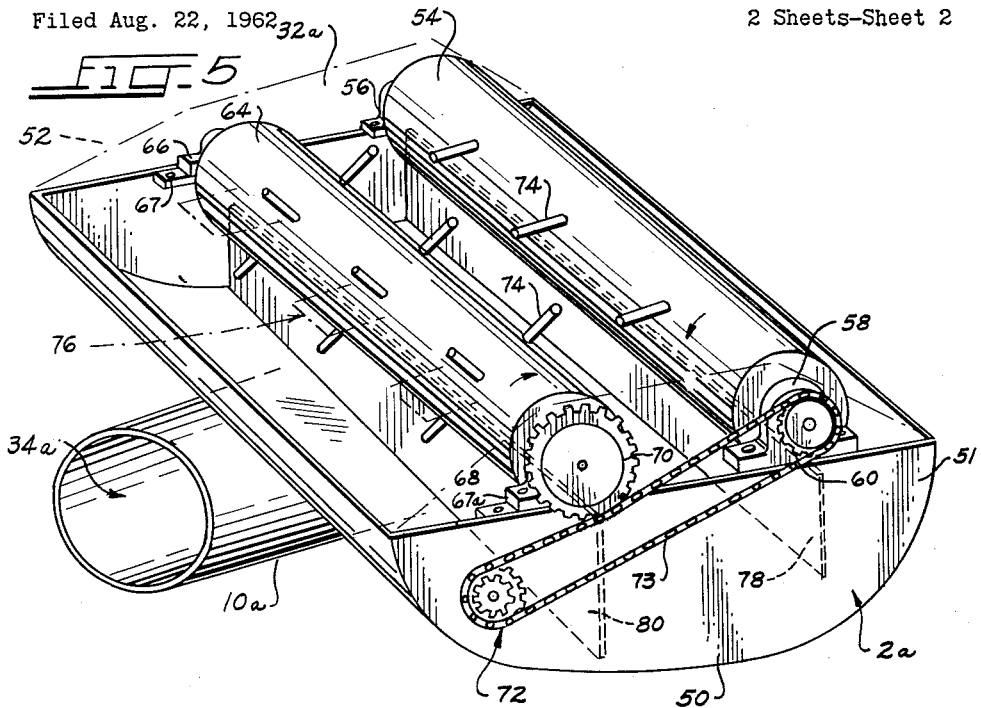
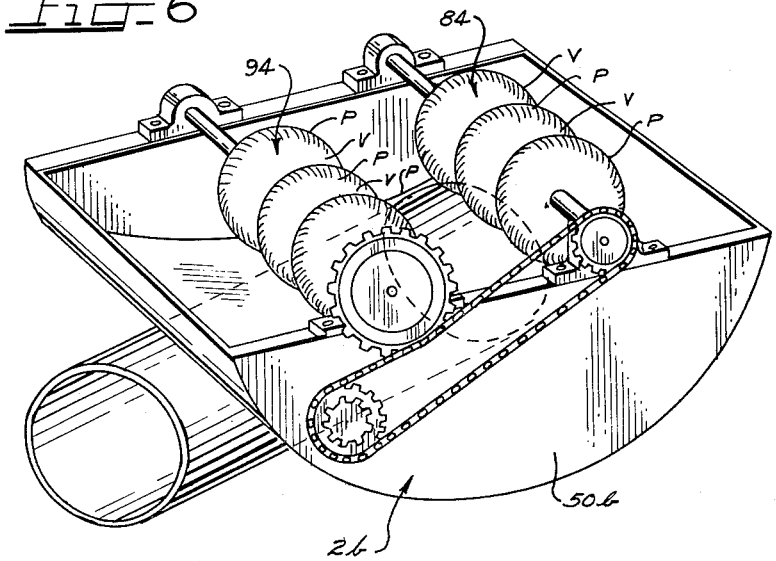
INVENTORS
WILLIAM T. MAYS
JOHN C. MAYS
BY United States Patent Office
3,138,912
Patented June 30, 1964

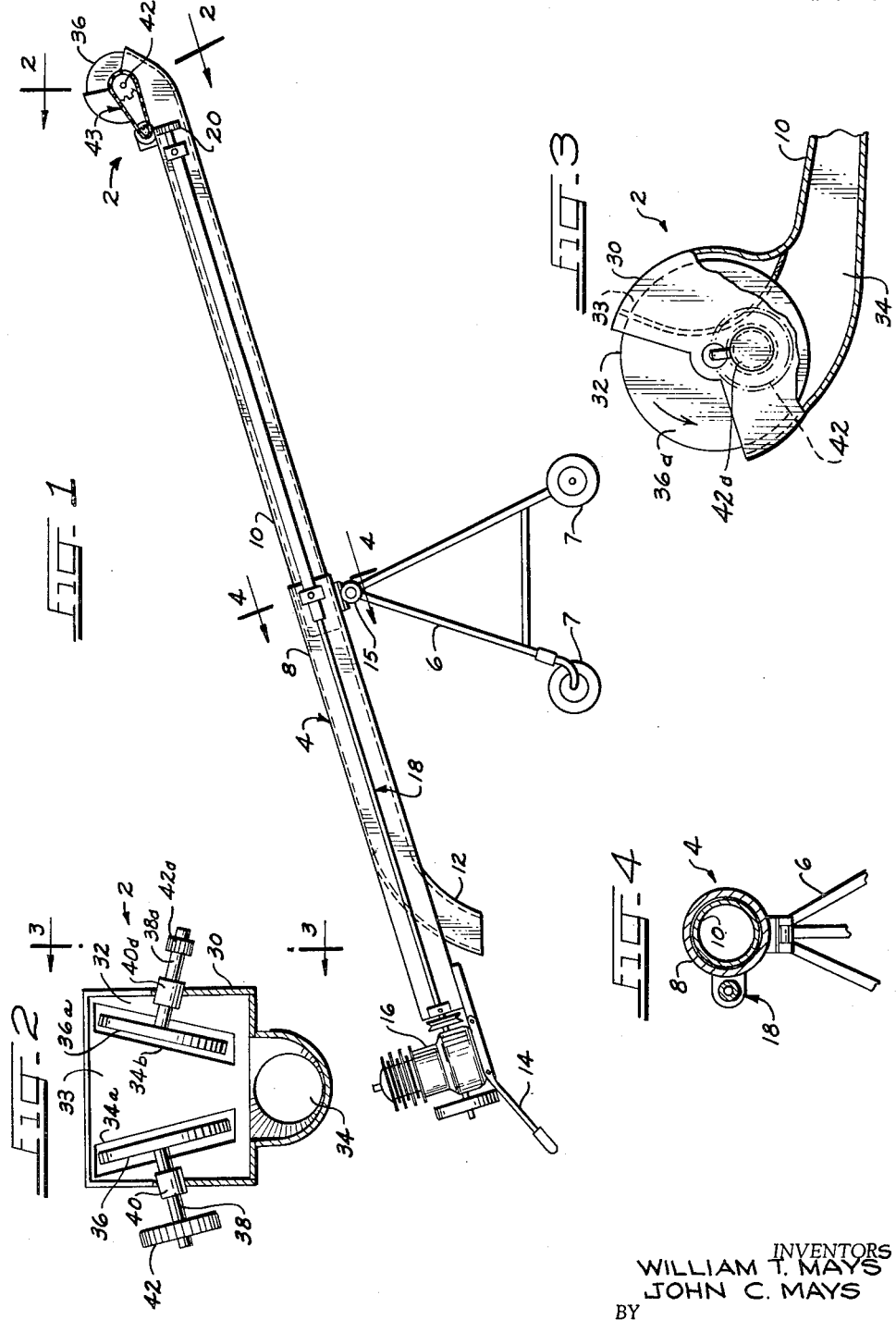

3,138,912
HARVESTING APPARATUS
William T. Mays and John C. Mays, Vero Beach, Fla.,
assignors to Maysome Company, Inc., Vero Beach,
Fla., a corporation of Florida
Filed Aug. 22, 1962, Ser. No. 218,759
5 Claims. (Cl. 56—328)

This invention relates generally to an improvement in harvesting equipment, and more particularly to an improved apparatus for the picking of fruit or similar products from trees, bushes, and the like.

The picking of fruit from trees without bruising or adversely affecting the fruit has heretofore been a tedious and expensive process and has materially increased the cost of the handled fruit. It has been conventional to pick the fruit by hand by pulling it from the stem or by cutting the stem and then depositing the fruit in a suitable receptacle. It is apparent that this hand picking method is highly laborious and time consuming and leaves much to be desired.

Various mechanical systems have heretofore been proposed to pick fruit and the like, but these systems generally suffer from disadvantageous features, such as an inability to handle the fruit gently without damaging or bruising even when resilient materials such as sponge rubber are employed as the handling media.

The present invention provides a harvesting unit adapted to remove articles such as fruit depending from trees and comprising in general a frame having an article entry area and an oppositely disposed article exit area, a first pressurized resilient member rotatably mounted in the frame, a second pressurized resilient member rotatably mounted in the frame, the said resilient members being located between the entry and the exit area, and means for rotating the said members at relatively different speeds, whereby when an article such as a fruit is positioned in the article entry area, it will be engaged between the said members and twisted free from its support for movement inwardly of the frame and subsequent exit through the article exit area thereof. It has been found that by utilizing pressurized resilient members as the fruit handling media a mechanical harvesting system can be provided which operates simply, efficiently, and without deleterious damage to the selected fruit article.

Accordingly, it is an object of the present invention to provide an improved apparatus for the picking or harvesting of fruit or similar products from trees, bushes, and the like, which apparatus may be simply operated and manipulated by an individual in control thereof.

It is a further object of this invention to provide a fruit harvesting apparatus of the described nature characterized by its ruggedness, simplicity, and ease of operation.

In a more specific sense, it is an object of this invention to provide a fruit harvesting unit which mechanically twists a selected fruit for detachment from its tree support by twisting and conveying fruit through the unit for subsequent egress to any conventional storage and process systems.

These and other objects, advantages, and features of the subject invention will hereinafter appear, and, for purposes of illustration, but not of limitation, exemplary embodiments of the subject invention are hereinafter described, with reference to the appended drawings in which:

FIGURE 1 is a side elevational view of a first embodiment of the invention employed in a tripod-supported telescopic boom assembly;

FIGURE 2 is an enlarged sectional view of the fruit harvesting unit, taken along the line 2—2 of FIGURE 1;

FIGURE 3 is a fragmentary side elevational view, partly in section, taken generally along the line 3—3 of FIGURE 2;

FIGURE 4 is an enlarged fragmentary sectional view of the tripod-supported telescopic boom taken along the line 4—4 of FIGURE 1;

FIGURE 5 is a perspective view of a second embodiment of the fruit harvesting unit; and FIGURE 6 is a similar view of yet a third embodiment of the fruit harvesting unit.

In the drawings, a first embodiment of the novel fruit harvesting unit is generally designated by the numeral 2, in FIGURES 1–3. The unit 2 is shown attached to one end of a telescopic boom assembly 4, which is supported on a conventional tripod base 6 and is mobilized by the wheels 7 attached to tripod base 6. The boom 4 comprises a generally hollow cylindrical element 8 which houses a second generally hollow cylindrical element 10 by telescoping coaxial alignment. The exterior cylindrical element 8 is provided with an exit port 12 leading from the interior thereof whereby an article deposited on the interior of the cylindrical element 10 will be gravity induced to fall through the telescopic boom arrangement and out through the exit port 12, into any conventional storage or handling facilities.

A handle 14 is provided adjacent the ground end of the boom support 4 so as to guide the fruit picking unit 2 to any desired location or elevation by movement of the tripod unit 6 or by rotation of the boom support relative to the tripod base 6, via a universal pivot connection 15 therebetween. Power source means, such as an internal combustion engine 16, is provided to drive the operative segments of the fruit harvesting unit 2. A telescoping transmission system 18 transforms the power output of the motor 16 for the rotation of a drive gear 20 located adjacent the fruit harvesting unit 2.

The fruit harvesting unit 2 comprises an enlarged hollow extension 30 of the cylindrical element 10. The extension 30 is contiguous with the cylindrical element 10 so as to provide an article exit area 34 and is partially cut away at its oppositely disposed end to provide an article inlet area 32. A baffle plate 33 is provided on the interior of the extension 30 to aid in the direction of fruit articles from the article inlet area 32 to the article exit area 34. The baffle plate 33 is provided with apertures 34a and 34b for accommodating the rotating members 36 and 36a respectively, as hereinafter described.

In the first indicated embodiment, the operative elements of the fruit harvesting unit 2 comprise pressurized resilient members 36 and 36a rotatably mounted in the extension frame 30. The members 36 and 36a comprise hollow cylindrical discs formed of a resilient material, such as rubber or plastic, and pneumatically pressurized to enhance the resiliency thereof.

The disc 36 is fixedly mounted on a shaft 38 which is rotatably journaled in a suitable bearing 40, such that the disc 36 may rotate with respect to the extension frame 30. A suitable gear 42 is likewise affixed to the shaft 38 in order to effectuate the desired rotational movement of the disc 36. Similarly, the disc 36a is mounted on a shaft 38a which is rotatably journaled in the bearing 40a, and which is provided with a suitable gear 42a. The gears 42 and 42a, as best seen in FIGURE 2, are disproportionate such that the discs 36 and 36a will be rotated at different speeds. The discs 36 and 36a are positioned in a skewed or non-parallel alignement diverging toward the article inlet area 32 and converging toward the article exit area 34, such that a fruit may be readily engaged between the two rotating discs and subjected to gradually increasing pressure as it is grasped between the converging discs.

As shown in FIGURE 1, a conventional sprocket drive assembly 43 is adapted to rotate the gear 42 in response to actuation of the drive gear 20. A similar sprocket drive assembly (not shown) is mounted on the opposite side of the fruit picking unit 2 in order to drive the gear 42a.

Preferably, means are provided for slight axial displacement of the discs 36 and 36a relative to each other. Thus, the illustrated bearings 40 and 40a may be spring-cushioned to provide a slight displacement of the discs 36 and 36a as a fruit article is grasped therebetween. In this manner, a positive hold and a twisting or turning action will be transmitted to the retained fruit article while it is being moved by the rotating discs from the article inlet area 32 to the article exit area 34. The twisting or turning movement effectuates the removal of the fruit article from its tree support, while the positive resilient grasp of the discs 36 and 36a about the fruit article enables a transmittal thereof without damaging or bruising the delicate fruit member.

A second embodiment of the invention generally designated by the numeral 2a is shown in FIGURE 5. The unit 2a comprises a frame member 50 having an article exit area 34 communicating with a hollow cylindrical element 10a similar to the cylindrical element 10 shown in FIGURE 1. The frame 50 comprises a bottom member 51 and a top baffle cover 52 shown in phantom in FIGURE 5. An article inlet area 32a is defined by a suitable opening in the baffle cover 52.

A first pressurized resilient member 54 is rotatably mounted in the frame 50, as by the bearing blocks 56 and 58. The member 54 is provided as a cylindrical element of resilient material which is pneumatically pressurized to enhance the resiliency thereof. A gear member 60 is operatively connected to the cylindrical element 54 in order to effectuate rotation thereof relative to the frame 50. Similarly, a second pressurized resilient member 64 is shown rotatably mounted on the frame 50, as by the bearing blocks 66 and 68. A gear 70, disproportionate in size to the gear 60, is operatively connected to the cylindrical element 64 in order to effectuate rotational movement of the cylindrical element 64 relative to the frame 50. The bearing blocks 66 and 68 are shown as mounted on adjustable supports 67 and 67a respectively, whereby the members 54 and 64 may be adjustably positioned relative to each other in order to accommodate varying size articles in the unit 2a.

A sprocket drive assembly 72 is provided to rotate the gear members 60 and 70 in a manner generally similar to the sprocket drive assembly 43 shown in FIGURE 1, which is provided to effect the rotation of the gears 16 and 17. However, in the FIGURE 5 embodiment, the sprocket chain 73 of the drive assembly 72 is transversely trained about the gears 60 and 70 such that these gears are caused to rotate in opposite directions. In this manner, the cylindrical elements 54 and 64 are caused to rotate in opposite directions as shown, for example, by the arrows in FIGURE 5.

Resilient fingers 74 are provided on the exterior of the cylindrical elements 54 and 64 in order to aid in the transmission of fruit articles therebetween. The fingers 74 are preferably continuations of the pressurized resilient elements 54 and 64, that is, the fingers 74 are hollow and the interiors thereof communicate with the respective interiors of the hollow cylindrical elements 54 and 64. Suitable detents 76 are provided in the top baffle plate 52 of the frame 50 such that rotation of the elements 54 and 64 will not be impeded by the extending fingers 74.

Baffle plates 78 and 80 are provided interiorly of the frame 50 in order to direct the fruit articles engaged by the cylindrical elements 54 and 64 into the article exit area 34a.

In operation, the rollers 54 and 64 are rotated in opposite directions as described and at varying different speeds by virtue of the relative size and disposition of the gear members 68 and 70. When a fruit article is positioned in the article entry area 32a, it will be engaged between the rotating resilient members 54 and 64, especially by virtue of the protruding extension fingers 74 attached thereto. Preferably, the slower moving of the two rollers (i.e., roller 64 in the illustrated embodiment) is provided with relatively more fingers 74 in order to equalize the action of the fingers 74 protruding from each of the members 54 and 64. The article will thus be twisted free from its support and moved inwardly of the frame 50 between the adjacent rollers 54 and 64 for subsequent exit through the article exit area 34a.

A third embodiment of the invention is illustrated in FIGURE 6 and is generally designated by the numeral 2b. The unit 2b is generally similar to the unit 2a shown in FIGURE 5, but, as illustrated, the frame 50b is of narrower dimensions than the frame 50 shown in FIGURE 5. Likewise, for clarity, the cover plate for the unit 2b is not shown in FIGURE 6. The unit 2b embodiment provides pneumatic resilient rollers 84 and 94 driven in opposite directions and at different speeds in the same fashion as the rollers 54 and 64 shown in FIGURE 5. However, in the FIGURE 6 embodiment, the rollers 84 and 94 are shown as having toroidal surfaces defined by the alternate elevations P and depressions V. The rollers 84 and 94 may comprise unitary elements having the designated variations in surface contour, or alternatively a series of stacked doughnut-type elements may be placed in a side-by-side column in order to yield the illustrated surface irregularities.

The operation of the fruit harvesting unit 2b is generally similar to that described for the embodiment illustrated in FIGURE 5 (i.e., unit 2a). By virtue of the opposite direction of rotation and the differential speeds imparted to the positioned resilient members, a fruit article may be grasped therebetween and twisted free from its support in a gentle and delicate fashion without damaging or bruising the conveyed article. In effect, the self-contained irregularities provided in the surfaces of the rollers 84 and 94 correspond to the fingers 74 provided on the otherwise smooth rollers 54 and 64 in the FIGURE 5 embodiment.

It should be understood that various changes and modifications may be made in the details of construction, arrangements, operations, and materials for the various elements without departing from the spirit or scope of the instant invention, especially as defined in the appended claims.

What is claimed is:

1. A harvesting unit adapted to remove detachable articles depending from a support comprising:

a frame having an article entry area and an oppositely disposed article exit area;

a first pressurized resilient member rotatably mounted in the frame;

a second pressurized resilient member rotatably mounted in the frame and spaced from the first said member in out of contact relation therewith, the said resilient members being located between the entry and the exit areas; and positive drive means for positively driving and rotating said members at different speeds, whereby when an article is positioned in the article entry area it will be engaged between said resilient members and twisted free from its support for movement inwardly of the frame and subsequent exit through the article exit area.

2. The unit of claim 1 wherein the pressurized spaced resilient members comprise pneumatic rollers driven by said drive means in opposite directions and at different speeds.

3. The unit of claim 2 wherein the spaced pneumatic rollers comprise cylindrical elements having article engaging resilient pneumatic fingers extending radially therefrom.

4. The unit of claim 2 wherein the spaced pneumatic rollers are equipped with toroidal surfaces.

5. The unit of claim 1 wherein the pressurized spaced resilient members comprise skewed discs driven by the rotating means in the same direction and at different speeds.

References Cited in the file of this patent
UNITED STATES PATENTS

| | | |
|---|---|---|
| 1,426,326 | Stukenborg | Aug. 15, 1922 |
| 1,753,919 | Cooper | Apr. 8, 1930 |
| 2,535,542 | Lehman et al. | Dec. 26, 1950 |
| 2,698,508 | Hollister | Jan. 4, 1955 |
| 2,827,659 | Rabun | Mar. 25, 1958 |
| 2,968,141 | McGough | Jan. 17, 1961 |